Dec. 13, 1949            P. COHEN            2,490,899
APPARATUS FOR DETERMINING THE PHASE RELATION
OF SINUSOIDAL ELECTRIC SIGNALS

Filed June 17, 1946            2 Sheets-Sheet 1

Inventor
Paul Cohen
By his Attorney

Dec. 13, 1949 P. COHEN 2,490,899
APPARATUS FOR DETERMINING THE PHASE RELATION
OF SINUSOIDAL ELECTRIC SIGNALS
Filed June 17, 1946 2 Sheets-Sheet 2

Inventor
Paul Cohen
By his Attorney

Patented Dec. 13, 1949

2,490,899

UNITED STATES PATENT OFFICE 2,490,899

APPARATUS FOR DETERMINING THE PHASE RELATION OF SINUSOIDAL ELECTRIC SIGNALS

Paul Cohen, Glen Cove, N. Y., assignor to United Shoe Machinery Corporation, Flemington, N. J., a corporation of New Jersey Application June 17, 1946, Serial No. 677,158

5 Claims. (Cl. 172—245)

This invention relates to improvements in systems for determining the distance to remote objects. More specifically, the invention relates to direct-reading indicator arrangements for systems which gage distance by determining the interval of time between the transmission and reception of amplitude modulated wave energy directed toward and reflected from an object. The invention is herein illustrated with particular reference to a system which projects a beam of sinusoidally modulated light toward a selected object and detects reflections therefrom, although the invention is equally applicable to analogous systems employing other kinds of radiation and including systems employing compressional or mechanical waves, and, in general, to the measurement of the phase relation of periodic waves, especially sinusoidal electric signals.

In one known system, the distance measurement is made by means of a cathode ray tube indicator on the screen of which appears a representation of the received signal, characterized by small abrupt deflections of the sweep trace. The position of such deflections indicates the distance to the object in question. In such a system, it will be apparent that interference voltages are also represented on the screen and, in the case of a particularly sensitive system, may be of such magnitude as to tend to obscure the representation of the desired signal.

Another known system utilizes, for determining the distance of an object, the phase interval between a propagated beam of sinusoidally modulated energy and the reflected rays. In such a system the received signal may be demodulated and filtered to provide a substantially pure sine wave of voltage corresponding to the modulation upon the reflected rays. However, the indicator means utilized therewith comprises a cathode ray tube upon whose face appear two traces respectively corresponding to the projected beam and the reflected rays. From the phase displacement of these traces, the distance of the object is calculated.

Such an indicator has the disadvantage that it is necessary to determine corresponding points on each trace, to take separate readings of the position of respective points on each trace, and to compute the difference in position. While the indicator of the first-described system does not have this difficulty, it is not adapted for comparing continuous signals having relatively slowly varying potentials since the sweep circuits therein are adapted for triggering by impulses which may be of various potentials.

Moreover, and this comprises an effect which magnifies the foregoing difficulty, the precision with which distance may be measured is dependent in part upon the bandwidth of the receiver, a large bandwidth being desirable; and, as is well known, wide band receivers generate more noise voltages than do equally sensitive narrow band receivers.

It is accordingly a broad object of the invention to provide an improved arrangement for determining the phase difference between significant signals and in which observance of only a single trace is required, thus making the arrangement direct-reading.

Conveniently and as herein illustrated, the phase difference between sinusoidal modulations upon propagated and reflected waves of a distance determining system may be measured by demodulating such waves to obtain two signals in the form of sinusoidally varying electric potentials corresponding to the modulation upon the respective waves and applying these signals for triggering sweep circuits connected to pairs of plates of a cathode-ray tube, these plates being disposed to produce horizontal and vertical traces on the cathode screen such that the location of the vertical trace alone is an indication of the modulation phase difference and hence of the distance to the object.

For effective comparison of the two signals, the sweep circuits are arranged to be triggered at equal input potentials and by another feature of the invention means are provided for equalizing the amplitudes of the sinusoidal signals from the propagated and received waves. For this purpose, the herein illustrated system employs a cathode-ray oscilloscope and a gain-control associated with an amplifier for the received wave. Conveniently, an electric switch permits viewing both signals simultaneously on the oscilloscope screen by rapidly and alternately applying them to the vertical deflecting plates of the oscilloscope.

The above and other features of the invention, including various novel aspects thereof, will now be more particularly described with reference to the accompanying drawings and thereafter will be pointed out in the claims.

Figure 1:
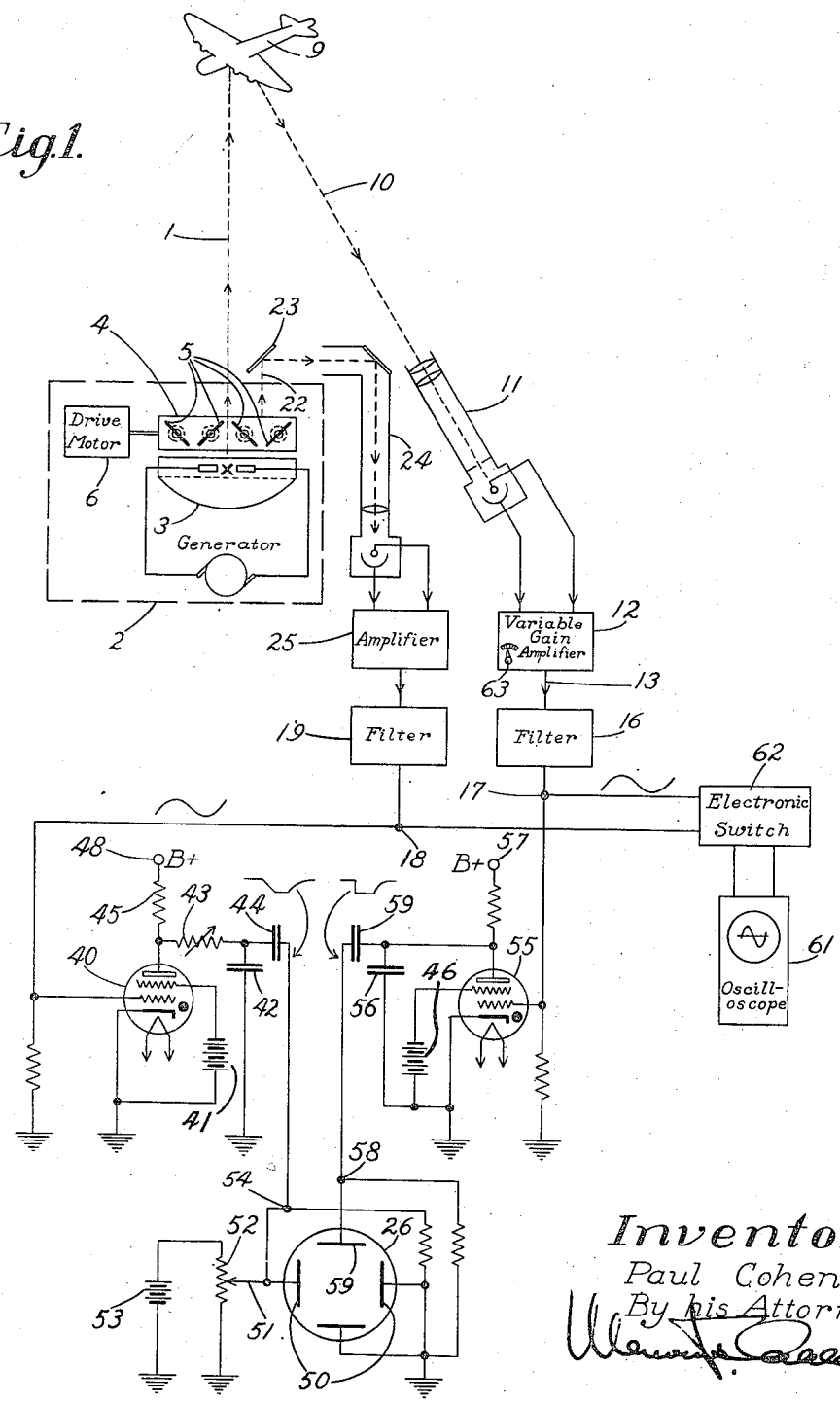
Fig. 1 illustrates schematically the preferred form of the invention as embodied in a system utilizing reflected light.

In the system shown in Fig. 1, a transmitted light beam 1 is produced by means of a modulated light source 2 comprising a conventional projection lamp 3, and a motor driven shutter 4. The shutter consists in a plurality of rotating blades 5 driven through shaft and gear connections by a synchronous motor 6. With the arrangement shown, the intensity modulation imparted by the shutter 4 to the light beam 1 approximates a sine wave.

Figure 2:
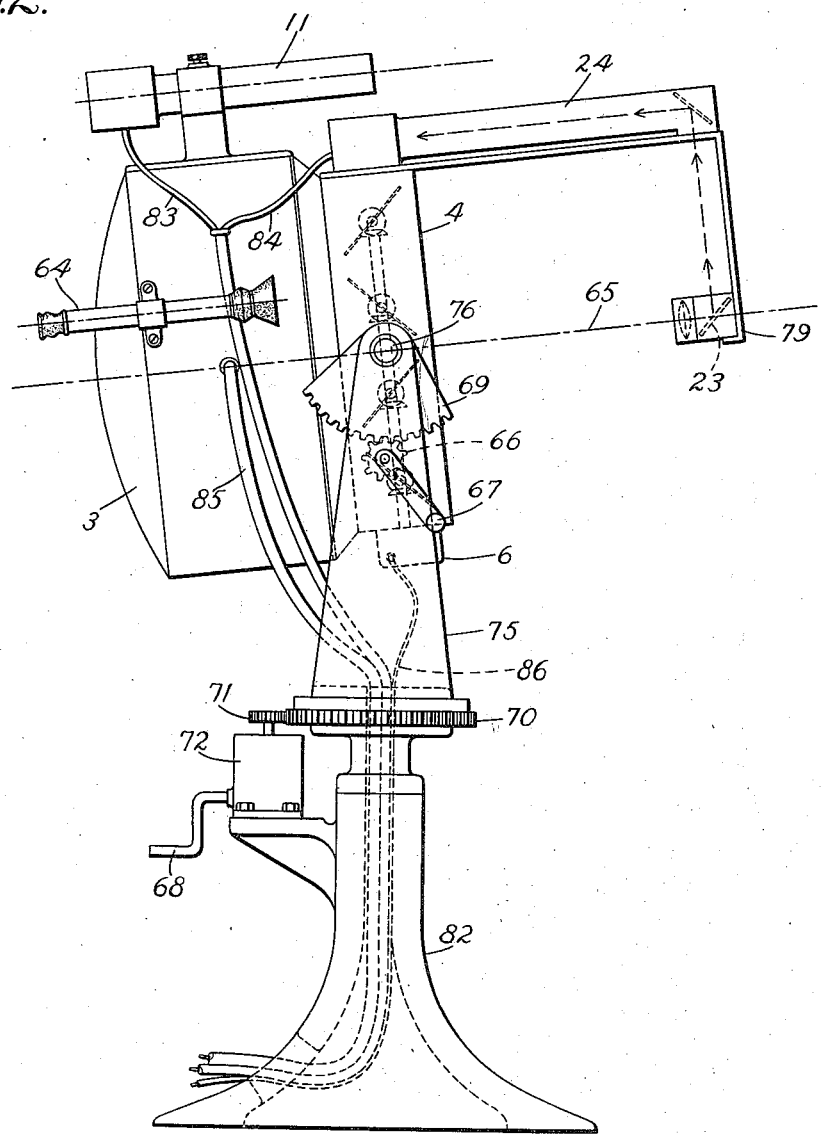
Fig. 2 shows a light projecting mechanism and light receiving apparatus used in connection with the invention as herein illustrated.

A suitable mechanism for propagating and receiving modulated light waves is shown in Fig. 2. In the operation thereof, an operator views the object in question through a telescope 64 alined with the beam axis 65 of the lantern projector 3. The target may be centered initially in the light beam by turning cranks 67 and 68 respectively to elevate the beam and to rotate it in azimuth. Crank 67 elevates the lantern 3 through pinion 66 and sector-gear 69. The azimuth drive consists in ring gear 70, integral with the upper rotating portion of the system, driven by pinion 71 which is rotated through gear box 72 by crank 68. The shutter assembly 4, operated by driving motor 6 is carried by a bifurcated yoke 75 having pins 76 in each of the two upwardly extending arms thereof. Lantern 3 is also carried by the shutter assembly. Light receiving means 11 and 24 are optically alined with and carried by the lantern and shutter assembly as is the reception mirror assembly 79 including mirror 23. Electrical cables 83 and 84 connecting the photocells in units 11 and 24 with their associated electrical circuits, along with cables 85 and 86 connected respectively for supplying electricity to the arc light in the lantern 66 and for driving the shutter motor 6, pass down through a central hole through the standard 82.

A reflecting object 9 in the path of the beam causes a reflection beam 10 having the original modulation of the direct beam, which modulation is detected and converted into an electric signal by means of a lens and phototube system 11. The signal is then applied to a variable gain receiving amplifier 12, which provides at its output terminal 13 the amplified signal representative of the foregoing modulation. Thereafter the signal passes to a selective high-Q filter circuit 16 adapted to pass only the fundamental modulation frequency thereby to produce a substantially pure sine wave at the output of filter 16, at point 17 in the circuit. Owing to the characteristics of the filter, this sine wave is substantially unaccompanied by interference signals existing in the circuits preceding the filter.

In the arrangement illustrated, a second sine wave representative of the light modulation at the projector, is produced for comparison in phase with the sine wave of the reflected beam. To this end, a small portion of light 22 from the beam 1 is intercepted by a mirror 23 and reflected into a second photoelectric system 24 arranged to produce an electric signal representative of the light modulation of the direct or transmitted beam 1. This signal is amplified in an amplifier 25, thereafter to pass to a filter circuit 19 which removes all but the fundamental frequency thereof and results in a substantially pure sine wave at 18, at the output of the filter circuit 19.

Figure 4:
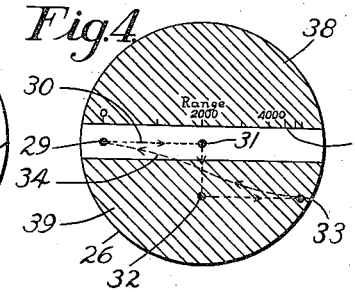
Fig. 4 shows the appearance of the cathode ray tube screen when making a distance measurement.

In the measurement of the phase difference between the sine waves appearing at points 17 and 18 for determining the distance to the object, use is made of a cathode ray tube indicator 26 and circuits associated therewith for causing horizontal timing and vertical signal sweep traces on the screen thereof. Fig. 4 illustrates the appearance of sweep traces on the screen of cathode ray tube 26 when measuring this phase difference. In this regard, the electron beam normally rests at position 29. From this position it is caused to move at a predetermined rate along path 30 thereby to produce the horizontal timing trace across the screen. This trace is interrupted at point 31 where the electron beam is deflected downwardly to point 32, thereby producing the vertical signal trace, and from there continues to point 33 where it remains for a period, later returning along path 34 to the starting point 29. The timing trace, between points 29 and 33, is caused by the voltage from a sweep circuit actuated by the sine wave at point 18, Fig. 1, while the signal trace, between points 31 and 32, is caused by another sweep circuit actuated by the sine wave at point 17. The length of path 30, the distance between points 29 and 31, is an indication of the range or distance to be determined and may be directly read from an index scale 35 marked over the face of the cathode-ray tube screen. To facilitate viewing the distance between points 29 and 31, a partial mask is placed over the cathode-ray tube screen at 38 and 39 leaving an open visible portion of the screen between the two masked areas. A portion of the path traced on the screen is therefore made invisible, to the advantage of the operator viewing the screen.

In producing the timing trace, the sine wave appearing at point 18 is applied to the first grid of a vacuum tube 40, a conventional thyratron. This tube is normally non-conductive owing to the negative bias applied to the second control grid thereof by means of a voltage source 41 connected between the second grid and the cathode. During the period of non-conduction in tube 40, a condenser 42 is caused to become charged through a variable resistor 43 and another resistor 45 to the D. C. supply voltage impressed on the circuit at terminal 48. During the charged condition of condenser 42 the potential applied between horizontal deflecting plates 50 of cathode ray tube 26 is constant and is that appearing at contactor 51 of a potentiometer 52, determined by the voltage of a battery 53.

During the positive half cycle of the sine wave at point 18 tube 40 becomes conductive and causes the discharge of condenser 42. Tube 40 will first become conductive when the sine wave voltage at the control grid has risen to a sufficiently positive value to overcome the effect of the bias voltage on the second grid. At the instant tube 40 becomes conductive, condenser 42 begins to discharge through variable resistor 43 and tube 40 to ground. This causes a voltage variation across the terminals of condenser 42 which is coupled through a blocking condenser 44 to point 54, resulting in the movement of the cathode beam between horizontal deflecting plates 50 along the path 30, Fig. 4, and comprises the timing-trace-producing voltage. The manner of determining from the circuit constants an appropriate scale marking for index 35, Fig. 4, is well-known and need not be referred to in detail herein. It will be appreciated also that variable resistor 43 may be adjusted to vary the rate of movement of the cathode beam horizontally across the screen 26 and that different scale indexes may be used to correspond with different settings of resistor 43. Moreover, there are other types of sweep circuits (not shown) which may be used in place of the circuit shown for creating the horizontal beam-sweep voltage.

In producing the signal trace it will be apparent that the sine wave at point 17 impressed on the control grid of a thyratron 55 causes a condenser 56 to discharge through tube 55 when that sine wave reaches a sufficiently positive value to overcome the effect of the bias voltage of a battery 46 connected to the second control grid of tube 55. A condenser 56 is normally charged to the voltage applied at point 57. When tube 55 becomes conductive the charge on condenser 56 is removed almost immediately, thus producing a sudden drop in voltage which passes through a blocking condenser 59 to point 58, and therefore to the vertical deflecting plates 50 of the cathode-ray tube 26 causing the vertical deflection (i. e., the signal trace) of the cathode beam between points 31 and 32, Fig. 4.

In the period following the initiation of the trace-producing voltages in the two respective circuits, the following effects may be noted. Condenser 56 remains discharged during the remaining portion of the positive half cycle of sine wave 17, since tube 55 remains conductive during that period. Condenser 42 continues to discharge through tube 40 and remains discharged during the remaining portion of the positive half cycle of the sine wave appearing at 18, and during this time the electron beam approaches point 33, Fig. 4. When the sine waves enter their negative half-cycle periods the respective thyratrons become non-conductive and the condensers 42 and 56 recharge, returning the electron beam to the starting position 29 in preparation for the next trace. The trace of the return movement is as aforementioned obscured to the operator and bears no relation to the measurement of range or distance to the object in question.

It is desirable in the interest of accuracy of the system that tubes 40 and 55 and their respective bias control voltages and supply voltages be exactly equal, and that each tube fire at the same potential in the cycle of the respective sine waves applied to the control grids thereof. It is quite possible in practice to achieve such similarity and therefore the phase relationship of the sine waves at points 18 and 17 may be accurately measured on the cathode-ray tube screen 26 indicated by the distance between points 29 and 31 in Fig. 4. Another factor of importance, however, in insuring that the distance 29 to 31 is a true index of phase difference between the two sine waves is that the amplitude of these waves should be equal. This insures that each tube will fire at the same relative point in the cycle of the respective sine waves. Amplitude equality may be accomplished in various ways, a preferred way being illustrated in Fig. 1.

Figure 3:
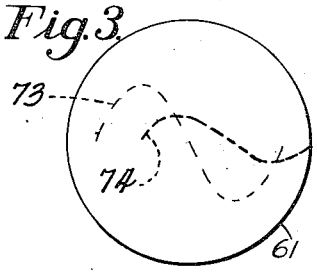
Fig. 3 shows diagrammatically how the relative amplitude of the aforementioned sine waves may be compared.

A cathode-ray oscilloscope 61 is provided to view the two sine waves in question. The appearance of these waves on the screen of tube 61 may be as in Fig. 3 in which curve 73 represents the appearance of the trace from the transmitted rays and curve 74 the trace from the reflected rays. This is accomplished by means of an electronic switch 62, a well-known device commercially available, which switches the vertical deflection plates of the oscilloscope 61 alternately and rapidly, the two sine wave voltages appearing at points 17 and 18. A saw-tooth sweep voltage is applied to the horizontal deflecting plates of the oscilloscope in the usual manner. The operator, upon detecting a difference in amplitude of the two sine waves may adjust the gain of receiving amplifier 12 by means of a knob 63 until the sine waves are of equal amplitude.

In the operation of the system, when the light beam from the projector has been trained on a selected object, such as an airplane, and just prior to a range measurement, an operator views the cathode-ray oscilloscope and adjusts the amplifier gain control until the sine waves appear of equal amplitude. The system is then in condition for taking a range measurement which may be read directly on the scale 35 by noting the position of the vertical signal trace 31, 32.

Having thus shown and described the invention in its preferred embodiment, what I claim as new and desire to secure by Letters Patent of the United States is:

1. In electronic timing apparatus, in combination, a cathode ray tube having horizontal and vertical beam deflection means, sweep circuits associated with each of said means, means for initiating one of said sweep circuits at a predetermined potential of a sinusoidal reference timing signal, and means for initiating the other of said sweep circuits at the same predetermined potential of a sinusoidal signal to be timed, whereby a single trace on the screen of said cathode ray tube indicates the time relationship between such signals.

2. Apparatus as in claim 1 and additionally comprising means for equalizing the amplitudes of the respective signals.

3. In an improved apparatus for indicating the time difference between corresponding portions of two approximately sinusoidal electric signals, a cathode ray tube having vertical and horizontal beam-deflection plates, a beam-sweep circuit connected to said horizontal deflection plates and arranged for triggering at a predetermined potential of a reference sinusoidal signal applied thereto to initiate a horizontal progressive timing trace, and a beam deflection circuit connected to said vertical deflection plates and arranged for triggering at the above-mentioned predetermined potential of a sinusoidal signal to be timed, in relation to the reference signal, to produce an abrupt vertical deflection of said timing trace.

4. Apparatus as in claim 3 and additionally comprising means for equalizing the amplitudes of the reference signal and the signal to be timed.

5. Apparatus for determining the phase difference between two sinusoidally varying electric signals of a given frequency comprising a cathode ray tube having vertical and horizontal beam deflection plates, a grid-controlled gaseous-discharge tube beam-sweep circuit having a condenser thereof connected to said horizontal deflection plates, means for charging said condenser, a gaseous discharge tube normally biased to be non-conductive for progressively discharging said condenser through a resistor when said tube is fired when one of said signals connected to its grid reaches a predetermined potential, a grid-controlled gaseous-discharge tube deflection circuit having a condenser thereof connected to said vertical deflection plates, means for charging said condenser, and a gaseous-discharge tube normally biased to be non-conductive for abruptly discharging said condenser when the other of said signals connected to its grid reaches a similar predetermined potential, oscilloscope means for determining the relative amplitude of the signals, and means for equalizing the amplitude of the signals.

PAUL COHEN.

REFERENCES CITED

The following references are of record in the file of this patent:

UNITED STATES PATENTS

| Number | Name | Date |
|---|---|---|
| 2,180,364 | Norton | Nov. 21, 1939 |
| 2,234,329 | Wolff | Mar. 11, 1941 |
| 2,237,193 | Mobsby | Apr. 1, 1941 |
| 2,405,238 | Seeley | Aug. 6, 1946 |
| 2,418,364 | Moe | Apr. 1, 1947 |